(12) United States Patent
Weare

(10) Patent No.: US 7,070,364 B2
(45) Date of Patent: Jul. 4, 2006

(54) REVERSE CHAMFER AND COUNTERSINK TOOL

(75) Inventor: Mark A. Weare, Weatherford, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 504 days.

(21) Appl. No.: 10/385,020

(22) Filed: Mar. 10, 2003

(65) Prior Publication Data

US 2004/0179905 A1  Sep. 16, 2004

(51) Int. Cl.
*B23B 35/00* (2006.01)

(52) U.S. Cl. .......................... 408/1 R; 408/14; 408/93; 408/110

(58) Field of Classification Search ................ 408/1 R, 408/14, 93, 110, 112, 113, 202, 241 S; 409/143
See application file for complete search history.

(56) References Cited

U.S. PATENT DOCUMENTS

| | | | |
|---|---|---|---|
| 554,443 A | 2/1896 | Henry | |
| 1,761,070 A | 6/1930 | Christensen | |
| 2,242,510 A * | 5/1941 | Cogsdill | 408/112 |
| 2,308,055 A * | 1/1943 | Cogadill | 408/112 |
| 2,308,447 A | 1/1943 | Greenbaum | 77/73.5 |
| 2,359,859 A | 10/1944 | Jarvis | 77/73.5 |
| 2,383,854 A * | 8/1945 | Gwinn, Jr. et al. | 408/112 |
| 2,390,744 A | 12/1945 | Smith | 77/66 |
| 2,402,353 A | 6/1946 | Trautmann | 77/73.5 |
| 2,409,377 A * | 10/1946 | Miller | 408/112 |
| 2,522,330 A | 9/1950 | Wright | 77/78.5 |
| 2,529,988 A * | 11/1950 | Zempel | 408/110 |
| 2,608,114 A * | 8/1952 | Martin et al. | 408/112 |
| 2,710,549 A * | 6/1955 | Cogsdill | 408/112 |
| 2,905,030 A * | 9/1959 | Cogsdill | 408/112 |
| 2,915,925 A | 12/1959 | Nipken | 77/55 |
| 3,028,774 A * | 4/1962 | Hausser et al. | 408/112 |
| 3,060,772 A * | 10/1962 | Crump | 408/112 |
| 3,454,059 A | 7/1969 | Sindelar | 144/32 |
| 3,689,171 A * | 9/1972 | Bouzounie | 408/112 |
| 4,115,017 A | 9/1978 | Wihelmsson | 408/14 |
| 4,764,060 A | 8/1988 | Khurana | |
| 5,096,342 A * | 3/1992 | Blankenship et al. | 408/112 |
| 5,182,973 A | 2/1993 | Martindell | |
| 5,795,110 A | 8/1998 | Wirth, Jr. et al. | 408/110 |
| 5,827,018 A | 10/1998 | Blankenship et al. | 408/82 |
| 5,882,151 A | 3/1999 | Wirth, Jr. et al. | 408/110 |

(Continued)

FOREIGN PATENT DOCUMENTS

DE    827571    1/1952

(Continued)

*Primary Examiner*—Daniel W. Howell
(74) *Attorney, Agent, or Firm*—Bracewell & Giuliani LLP

(57) ABSTRACT

A reverse chamfering and countersink stop tool allows the required diameter of a countersink in a workpiece to be maintained in areas that have limited accessibility for the user assembling a fastener to the workpiece. The tool controls the dimension required for proper installation of fasteners under such conditions. The tool can also be used for other applications that require control of the diameter of a chamfer, and allows the diameter of the chamfer/countersink to be set outside the point of use for maintaining proper tolerances. The tool utilizes a modified reverse countersink cutter that is captured inside an externally threaded adjustable stop housing. The captured cutter is movable both axially and rotationally, and is driven by a drill equipped with a pilot. The stop position of the cutter is controlled by a series of nuts that are located and threaded on the exterior of the housing.

17 Claims, 4 Drawing Sheets

U.S. PATENT DOCUMENTS 6,401,573 B1  6/2002  McClure ........................ 81/58
6,471,450 B1  10/2002 Mercier ..................... 408/1 R

FOREIGN PATENT DOCUMENTS

| DE | 2209668 | | 9/1973 |
| DE | 4318251 | * | 12/1994 |
| FR | 2268591 A | | 11/1975 |
| GB | 431711 | | 7/1935 |
| GB | 554909 | | 7/1943 |
| JP | 4-275809 | * | 10/1992 |
| JP | 2000-107921 | * | 4/2000 |

* cited by examiner

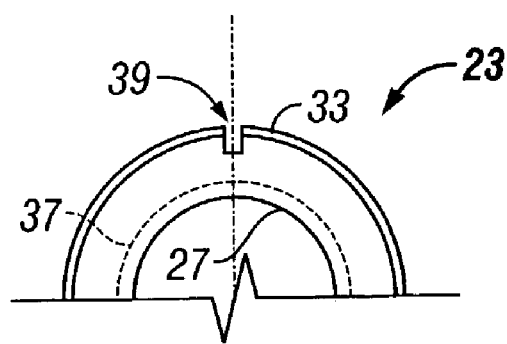
FIG. 10
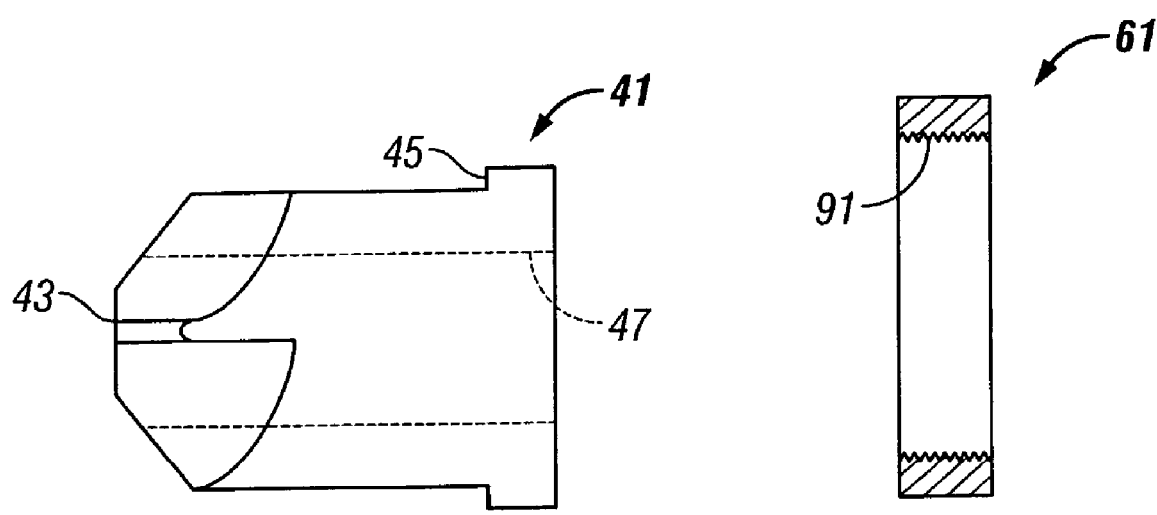
FIG. 11
FIG. 12
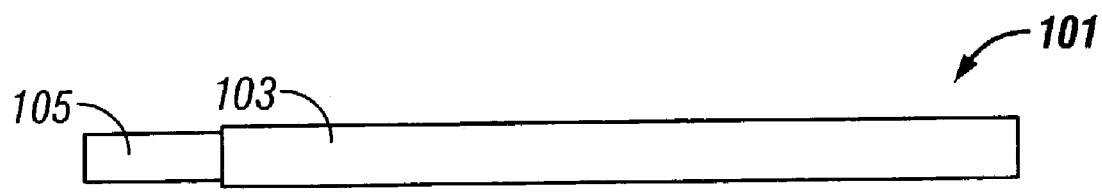
FIG. 13

US 7,070,364 B2

REVERSE CHAMFER AND COUNTERSINK TOOL

This invention was made with Government support under Contract Number F33657-99-C-0036 awarded by The Department of the Air Force. The Government has certain rights in this invention.

BACKGROUND OF THE INVENTION

1. Technical Field

The present invention relates in general to an improved countersink tool, and in particular to an improved tool for forming countersinks in locations on workpieces that are obstructed or difficult to access.

2. Description of the Related Art

Devices for forming countersinks in workpieces are common in the prior art. A wide variety of countersink devices are commercially available and commonly used in many different manufacturing and assembly processes. Countersink devices are particularly helpful in quickly forming countersink and/or chamfer features in workpieces, and doing so at with precise dimensions. In particular, countersink devices predetermine the depth at which a countersink cutter penetrates the workpiece. In order to achieve this purpose, a typical countersink device is attached to a power tool, such as a drill, to form the hole. The countersink device prevents the cutter from penetrating into the workpiece any further than the predetermined depth. After the countersink is formed, a fastener, such as a screw, is inserted into the hole so that the outer surface of the screw is flush with the surface of the workpiece.

Controlling the flushness of fasteners with respect to the workpiece is a critical assembly process. Currently, the user does not have a countersink stop tool for applications wherein access to the fasteners is limited visually and/or physically. However, users are still required to visually inspect or verify the finished workpiece to determine if the countersink depth is acceptable, which can be a very inconsistent process. Indeed, most countersink devices are engaged by power tools through a rear end of the device (i.e., through an end opposite the cutting end) such that the power tools require a significant amount of operating space behind the countersink device. Some formations in workpieces have such limited access, both physically and visually, that this arrangement is unworkable.

Moreover, many commercially available designs of countersink tools also allow the countersink stop to rotate with the cutting tool. This is an unacceptable design for many applications because the rotating stop deforms or scuffs the surface of the workpiece. In addition, these prior art designs are based on a precise dimension measured from their cutters to their stops. During normal use, the cutters will become worn and must be refurbished or replaced. However, the cutters cannot be re-sharpened because the dimension from the cutter to the stop would be altered, thereby rendering the tool useless. Thus, a need exists to provide an improved chamfer tool that overcomes these limitations found in prior art devices.

SUMMARY OF THE INVENTION

One embodiment of a reverse chamfering and countersink stop tool constructed in accordance with the present invention allows the required diameter of a countersink in a workpiece to be maintained in areas that have limited accessibility for the user assembling a fastener to the workpiece. The tool controls the dimension required for proper installation of fasteners under such conditions. The tool can also be used for other applications that require control of the diameter of a chamfer. The tool allows the diameter of the chamfer/countersink to be set outside the point of use for maintaining proper tolerances. The present design utilizes a modified reverse countersink cutter that is captured inside an externally threaded adjustable stop housing. The captured cutter is movable both axially and rotationally, and is driven by a drill equipped with a pilot. The stop position of the cutter is controlled by a series of nuts that are located and threaded on the exterior of the housing.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

FIG. 10 is a partial front view of the housing of FIG. 9;

FIG. 11 is a side view of a c utter of the tool of FIG. 1;

FIG. 12 is a sectional side view of a jam nut of the tool of FIG. 1;

FIG. 13 is a side view of one embodiment of a pilot for the tool of FIG. 1.

DETAILED DESCRIPTION OF AN ILLUSTRATIVE EMBODIMENT

Figure 9:
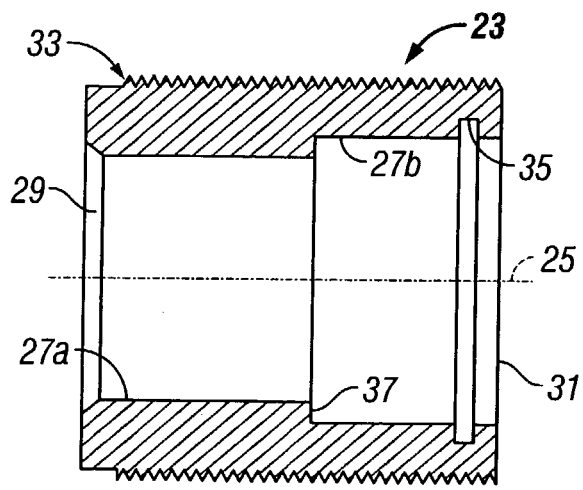
FIG. 9 is a sectional side view of a housing of the tool of FIG. 1.

Referring to FIGS. 1–4, one embodiment of a tool 21 constructed in accordance with the present invention is shown. Tool 21 comprises a number of different components that are assembled and used to together to form tool 21. For example, in the embodiment shown, tool 21 comprises a generally tubular housing 23, which is best shown in FIGS. 9 and 10. Housing 23 has an axis 25 and a cylindrical bore 27 (defined by two different diameters, 27a and 27b) extending axially through the housing 23. A cutting opening 29 is formed on one end of the housing 23 at bore 27, and a loading opening 31 is formed on an opposite end thereof. The housing 23 also has an external surface with threads 33 formed thereon. A seat 35 is located in the bore 27 and comprises an annular recess. A shoulder 37 is also located in the bore 27, such that the bore 27 has at least the two diameters 27a, 27b, defined on opposite axial sides of shoulder 37. In addition, a slot 39 extends axially along the external surface of the housing 23 through the threads 33. In the embodiment shown, slot 39 extends from cutting opening 29 to loading opening 31.

As shown in FIGS. 1–4 and 11, tool 21 also comprises a cutter 41 that locates in the bore 27 of the housing 23. Cutter 41 is loaded through the loading opening 31, and is axially and rotationally movable relative to the housing 23. Cutter 41 has a cutting end 43, a flange 45, and a hollow bore with a drive feature 47. In the embodiment shown, the drive feature 47 comprises a keyed slot, spline-type feature, or the like (such as the tools employed by those skilled in the art) for being engaged by another device (see, e.g., FIGS. 13–15) such that cutter 41 is rotationally driven within housing 23. Note that drive feature 47 may be accessed through either end of cutter 41 by extending the driving device through one of the ends of tool 21.

The cutter 41 also has a "cutting position" defined by the flange 45 abutting the shoulder 37 in the bore 27 of the housing 23. In the cutting position, the cutter 41 is prevented from further axial movement in the direction of the shoulder 37 and cutting opening 29. In addition, the cutting end 43 extends beyond the cutting opening 37 of the housing 23 when the cutter 41 is in the cutting position. A snap ring 51 (FIGS. 1, 3, and 4) or other retaining device is mounted in the seat 35 of the bore 27 of the housing 23 to prevent the cutter 41 from axially exiting the loading opening 31 of the housing 23 when the cutter 41 is not in the cutting position.

Referring again to FIGS. 1 and 3, the tool 21 utilizes a sub-assembly that is collectively known as a locking mechanism 61. Locking mechanism 61 is used by tool 21 to adjust the cutting depth and diameter of cutter 41 by controlling the exposure of the cutting end 43 beyond the outermost axial end of tool 21. In the embodiment shown, locking mechanism 61 comprises three components: a control nut 63, a staging washer 65, and a jam nut 67, each of which is described in greater detail in the following paragraphs.

As shown in FIGS. 1, 3, 5, and 6, the control nut 63 has internal threads 71 and is designed to be threadingly secured to the threads 33 on the housing 23. Rotation of the control nut 63 relative to the housing 23 moves the control nut 63 axially relative to the housing 23. The control nut 63 also has a control end 73 and a lock feature end 75 located opposite the control end 73. In the embodiment shown, lock feature end 75 comprises castellations, notches, grooves, teeth, or the like. The control nut 63 is axially positioned on housing 23 to adjust an exposure of the cutting end 43 of the cutter 41 beyond the cutting opening 29 of the housing 23 when the control end 73 is located beyond the cutting opening 29 of the housing 23.

Referring now to FIGS. 1, 3, 7, and 8, the staging washer 65 is designed to be mounted to the external surface (i.e., threads 33) of the housing 23. However, the staging washer 65 has a smooth bore 81 extending axially therethrough rather than threads. Staging washer 65 also has a pin 83 extending radially through a hole 85 in the staging washer 65, such that the pin 83 protrudes radially inward of bore 81. The pin 83 is permanently secured (e.g., press-fit) in staging washer 65. The pin 83 locates in the axial slot 39 in the housing 23 to limit rotational movement of the staging washer 65 relative to the housing 23, while allowing axial movement of the staging washer 65 relative to the housing 23. The staging washer 65 also has a lock feature end 87 that is complementary to and couples with the lock feature end 75 on control nut 63. Lock feature end 87 is designed to engage the lock feature end 75 of the control nut 63 to prevent rotation of the control nut 63 relative to the housing 23. Such engagement prevents axial movement of both the staging washer 65 and the control nut 63 relative to the housing 23. As described above, each of the lock feature ends 75, 87 comprises a set of castellations that interlock to prevent relative rotation between the control nut 63 and the staging washer 65.

Figure 1:
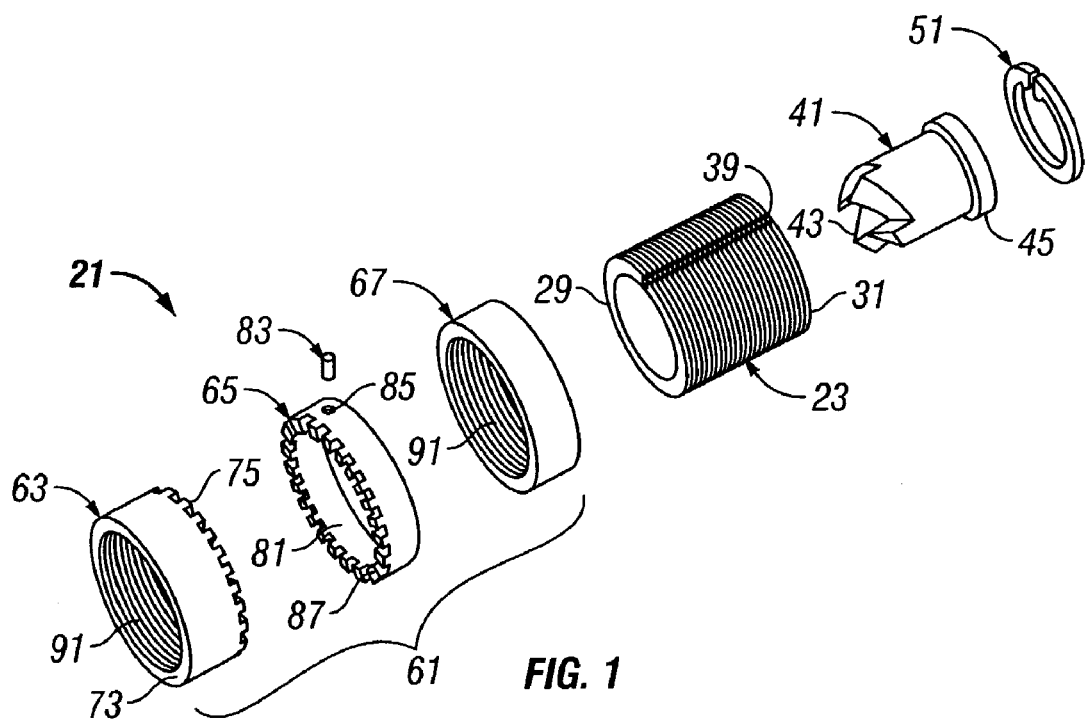
FIG. 1 is an exploded isometric view of one embodiment of a tool constructed in accordance with the present invention.
Figure 2:
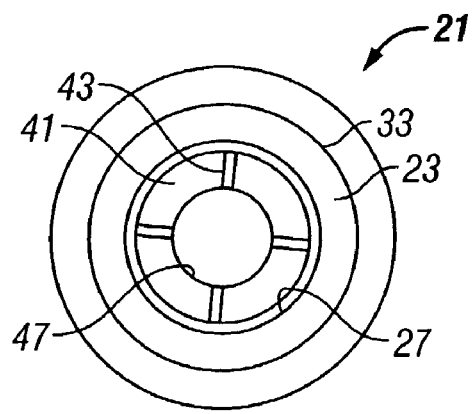
FIG. 2 is a front view of the tool of FIG. 1
Figure 3:
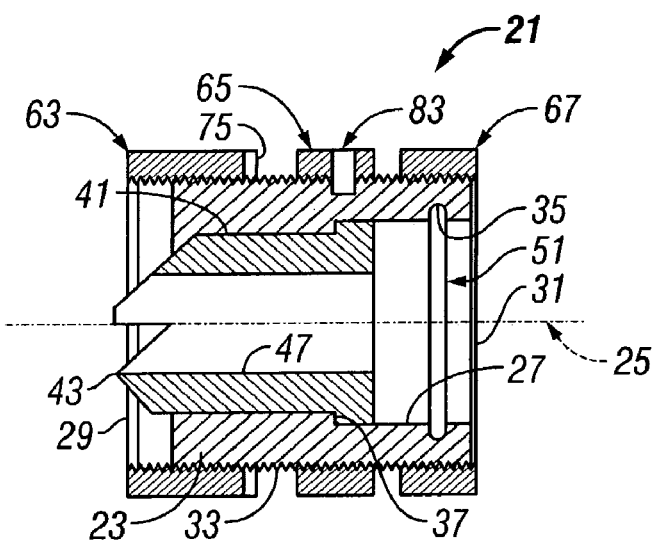
FIG. 3 is a sectional side view of the tool of FIG. 1.
Figure 4:
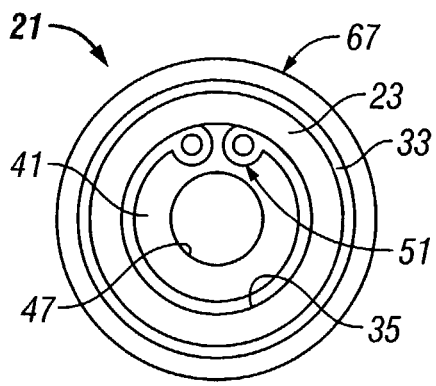
FIG. 4 is a rear view of the tool of FIG. 1
Figure 5:
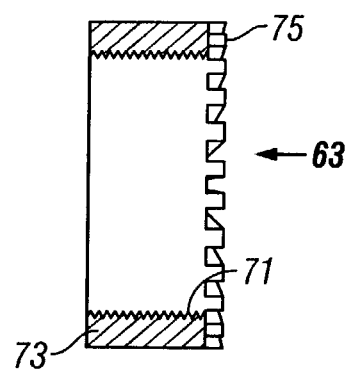
FIG. 5 is a sectional side view of a control nut of the tool of FIG. 1.
Figure 6:
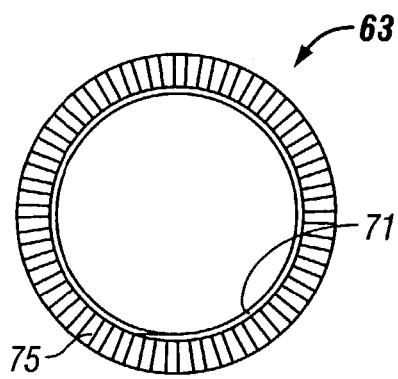
FIG. 6 is a rear view of the control nut of FIG. 5.
Figure 7:
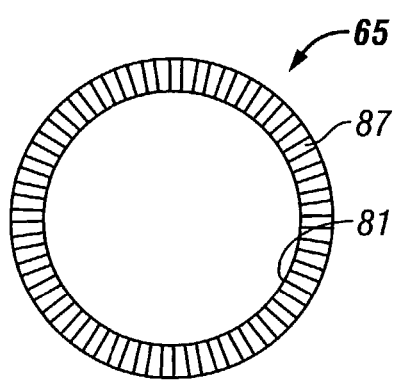
FIG. 7 is a front view of a staging washer of the tool of FIG. 1
Figure 8:
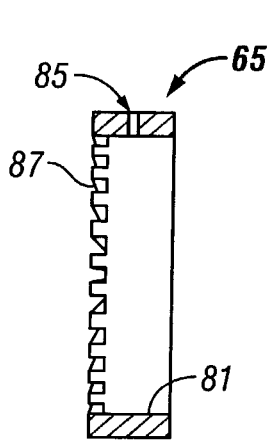
FIG. 8 is a sectional side view of the staging washer of FIG. 7.

The third and final component of this embodiment of the locking mechanism 61 is the jam nut 67. As shown in FIGS. 1, 3, and 12, jam nut 67 has internal threads 91 that are designed to threadingly secure to the threads 33 on the housing 23, such that rotation of the jam nut 67 relative to the housing 23 moves the jam nut 67 axially relative to the housing 23. The jam nut 67 is designed to be positioned in flush abutting relation with the staging washer 65 to ensure axial restraint of the staging washer 65 and the control nut 63 when their respective lock feature ends 75, 87 are engaged.

The third and final component of this embodiment of the locking mechanism 61 is the jam nut 67. As shown in FIGS. 1, 3, and 12, jam nut 67 has internal threads 91 that are designed to threadingly secure to the threads 33 on the housing 23, such that rotation of the jam nut 67 relative to the housing 23 moves the jam nut 67 axially relative to the housing 23. The jam nut 67 is designed to be positioned in flush abutting relation with the staging washer 65 to ensure axial restraint of the staging washer 65 and the control nut 63 when their respective lock feature ends 75, 87 are engaged.

Figure 14:
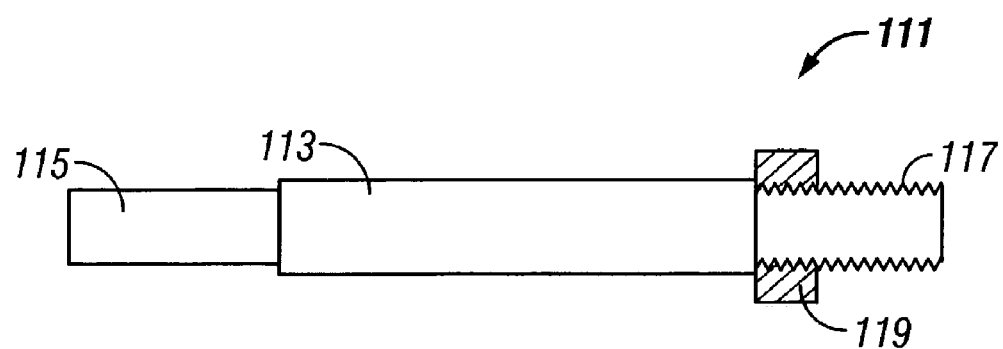
FIG. 14 is a partially sectioned side view of another embodiment of a pilot for the tool of FIG. 1.

Referring now to FIGS. 13 and 14, two embodiments of another component that is used with tool 21 in operation are shown. FIG. 13 depicts a non-threaded pilot 101, while FIG. 14 depicts a threaded pilot 111. Each pilot 101, 111 comprises a shank 103, 113 having a drive feature 105, 115, respectively, for engaging and driving the drive feature 47 in cutter 41. Drive features 105, 115 may comprise, for example, a key, spline, or the like. Pilot 111 also has a threaded end 117 and a nut 119 for alternate means of engagement with a driving device, such as a drill.

In operation (FIG. 15), the tool 21 is used in a method of forming a precise chamfer or countersink in a workpiece. Initially, the depth and diameter of desired cut by the cutter 41 is adjusted by manually moving the components of the locking mechanism 61 such that the cutting end 43 protrudes from the tool 21 and beyond the locking mechanism 61 at the desired depth and diameter. To set the cutting depth and diameter, the cutter 41 must be in the cutting position (described above), such that flange 45 abuts shoulder 35 in housing 23.

The control nut 63, staging washer 65, and jam nut 67 are mounted to the housing 23 but out of engagement with each other (see, e.g., FIG. 3). Next, the control nut 63 is rotated until its control end 73 is positioned (axially) to expose only that portion of cutting end 43 that is desired. The staging washer 65 is moved axially toward control nut 63 with its pin 83 sliding in slot 39 of housing 23 until their respective lock feature ends 87, 75 engage and interlock to prevent relative rotation therebetween. The jam nut 67 is then rotated so that it moves axially toward staging washer 65 until they abut each other. When jam nut 67 is in flush abutment with staging washer 65, the locking mechanism 61 (and, therefore, the control end 73) is secured and restrained from motion both rotationally and axially with respect to housing 23. The locking mechanism 61 and, thus, the cutting depth and diameter of cutter 41, may be readjusted by reversing this sequence and then repeating the sequence. To determine if the cutting depth and diameter are indeed proper and at the desired depth and diameter, sample countersinks may be formed by tool 21 in a test workpiece, in a manner similar to that described below.

Figure 15:
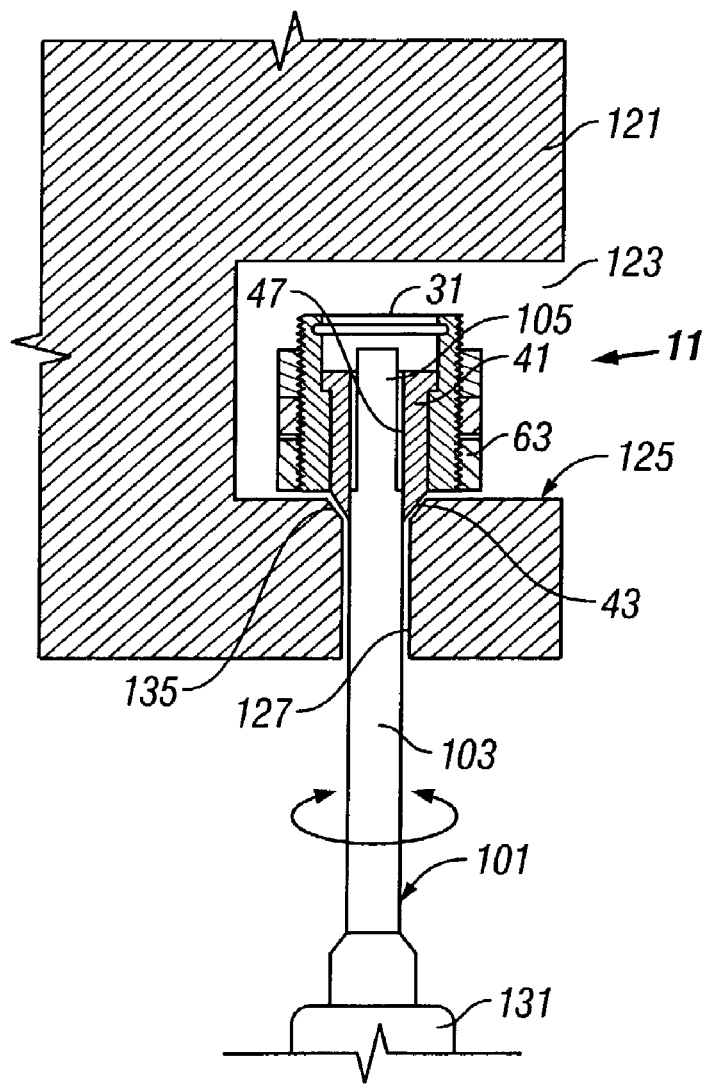
FIG. 15 is a sectional side view of the tool of FIG. 1 in operation while forming a countersink in a workpiece

Tool 21 is ideally suited for forming countersinks in locations on workpieces that are difficult to access and/or which do not provide adequate space for conventional countersink-forming and compliance/verification tooling. For example, as shown in FIG. 15, a workpiece 121 has a small recess 123 with a surface 125 in which a countersink is required. The recess 123 is so small that any countersink formed in surface 125 would have to be visually inspected for accuracy and compliance. Such manual, user-verified methods of inspection are prone to error and inconsistency.

As an alternative method of forming a countersink in accordance with the present invention, a small pilot hole 127 is formed in workpiece 121 such that recess 123 (and, thus, tool 21) is accessible from an exterior of the workpiece 121, as shown. Tool 21 is then manually positioned and centered on pilot hole 127 and a pilot or driver, such as one of the pilots 101, 111, is inserted through pilot hole 127. For example, if pilot 101 is used, its shank 103 is mounted in a driver, such as drill 131, and its drive feature 105 extends beyond pilot hole 127 to engage the drive feature 47 inside cutter 41.

As tool 21 is manually stabilized against surface 125 of workpiece 121, the drill 131 is positioned adjacent to workpiece 121 and rotates pilot 101 and, thus, cutter 41 inside housing 23. Housing 23 remains stationary during this operation so as to not damage or mark the workpiece 121. The cutting end 43 of cutter 41 then bores down into surface 125 to form the precisely-defined countersink 135. Since control nut 63 is locked from motion and its control end 73 is flush against the surface 125, the depth and width at which the countersink 135 is formed are very precisely controlled as cutter 41 is strictly limited to rotational motion while in the cutting position (i.e., immobilized from axial motion toward control nut 63). As an added convenience for situations that are not space-constrained, the pilot also may be inserted from the backside of housing 23 (i.e., via loading opening 31) to drive cutter 41. Other than the direction of insertion of the pilot, tool 21 operates in the same manner in this latter scenario.

The present invention has several advantages. A reverse chamfering and countersink stop tool constructed in accordance with the present invention allows the required diameter of a countersink in a workpiece to be maintained in areas that have limited accessibility for the user assembling a fastener to the workpiece. The tool controls the dimension required for proper installation of fasteners under such conditions. The tool can also be used for other applications that require control of the diameter of a chamfer. The tool allows the diameter of the chamfer/countersink to be set outside the point of use for maintaining proper tolerances. The present design utilizes a modified reverse countersink cutter that is captured inside an externally threaded adjustable stop housing.

While the invention has been shown or described in only some of its forms, it should be apparent to those skilled in the art that it is not so limited, but is susceptible to various changes without departing from the scope of the invention

The invention claimed is:

1. A tool, comprising:
   a housing having an axis, an axial bore, a cutting opening on one end of the bore, a shoulder in the bore, and external threads;
   a cutter located in and rotatable relative to the bore of the housing, the cutter having a cutting end, a stop, a drive feature, an axial aperture extending through the cutter from the cutting end to the drive feature, and a cutting position defined by the stop abutting the shoulder in the bore of the housing to limit a protrusion of the cutting end axially beyond the cutting opening of the housing;
   a control nut threaded onto the threads on the housing such that rotation of the control nut relative to the housing moves the control nut axially relative to the housing, the control nut being adjustably positioned to control an exposure of the protrusion of the cutting end of the cutter beyond the cutting opening of the housing when the control end is located axially beyond the cutting opening of the housing; and
   a staging washer having an axial bore through which extends the housing, the staging washer being adjustably positioned to prevent rotation and, thereby, axial movement of the control nut relative to the housing upon engagement of the staging washer with the control nut.

2. The tool of claim 1, further comprising a jam nut threadingly coupled to the housing such that rotation of the jam nut relative to the housing moves the jam nut axially relative to the housing, the jam nut being positioned in an adjustable, abutting relation with the staging washer to axially restrain the staging washer and, thereby, the control nut when the staging washer and the control nut are engaged.

3. The tool of claim 1, further comprising a pilot for engaging the cutter the pilot being adapted to be mounted in a drill for rotation by the drill such that the pilot rotationally drives the cutter in the housing without rotating the housing.

4. The tool of claim 1, wherein the housing has an exterior with an axial slot, and wherein the staging washer has a pin extending radially through the staging washer, the pin being located in the slot in the housing to limit rotational movement of the staging washer relative to the housing while allowing axial movement of the staging washer relative to the housing.

5. The tool of claim 1, wherein the stop is located on an end of the cutter opposite the cutting end.

6. The tool of claim 1, wherein the control nut has a control end and a lock feature end located opposite the control end, and the staging washer also has a lock feature end, such that engagement of the lock feature ends of the staging washer and the control nut prevents relative rotation therebetween.

7. The tool of claim 1, wherein the bore of the housing has a loading opening opposite the cutting opening, and a seat adjacent the loading opening, the loading opening being for loading and unloading the cutter relative to the housing, and wherein the tool further comprises:
   a snap ring mounted in the seat for retaining the cutter in the bore of the housing.

8. A tool, comprising:
   a housing having an axis, a generally tubular shape, a bore extending axially through the housing, a cutting opening, a loading opening, an external surface, threads on the external surface, a seat located in the bore, a shoulder located in the bore, and a slot extending axially along the external surface;

a cutter located in the bore of the housing and being axially and rotationally movable relative to the housing, the cutter having a cutting end, a flange, and a drive feature, the cutter also having a cutting position defined by the flange abutting the shoulder in the bore of the housing such that the cutter is prevented from further axial movement in the direction of the shoulder and the cutting end extending beyond the cutting opening of the housing;

a snap ring mounted in the seat of the bore of the housing to prevent the cutter from axially exiting the loading opening of the housing;

a control nut having internal threads and threadingly secured to the threads on the housing such that rotation of the control nut relative to the housing moves the control nut axially relative to the housing, the control nut also having a control end and a lock feature end located opposite the control end, the control nut being axially positioned to adjust an exposure of the cutting end of the cutter beyond the cutting opening of the housing when the control end is located beyond the cutting opening of the housing;

a staging washer mounted to the external surface of the housing, the staging washer having a bore extending axially therethrough, and a pin extending radially through the staging washer, the pin being located in the slot in the housing to limit rotational movement of the staging washer relative to the housing while allowing axial movement of the staging washer relative to the housing, the staging washer also having a lock feature end, such that engagement of the lock feature ends of the staging washer and the control nut prevents rotation of the control nut relative to the housing, which prevents axial movement of both the staging washer and the control nut relative to the housing; and a jam nut having internal threads and threadingly secured to the threads on the housing such that rotation of the jam nut relative to the housing moves the jam nut axially relative to the housing, the jam nut being positioned in abutting relation with the staging washer to ensure axial restraint of the staging washer and the control nut when their respective lock feature ends are engaged.

9. The tool of claim 8, wherein each of the lock feature ends comprise a set of castellations that interlock to prevent relative rotation between the control nut and the staging washer.

10. The tool of claim 8, further comprising a pilot for engaging the drive feature of the cutter, the pilot being adapted to be mounted in a drill for rotation by the drill such that the pilot rotationally drives the cutter in the housing without rotating the housing.

11. A method of forming a countersink, comprising:
providing a tool having a cutter and a locking mechanism;
adjusting the locking mechanism such that the cutter is limited to protrude from the tool and beyond the locking mechanism at a desired dimension;
securing the locking mechanism from movement relative to the tool;
positioning the tool adjacent to a workpiece; and then
actuating the cutter relative to the tool and the locking mechanism to form a countersink in the workpiece by inserting a driver into the tool through the cutter and forming the countersink in a direction toward the driver.

12. The method of claim 11, wherein the adjusting and securing steps comprise adjusting a control device to set the desired depth, adjusting a staging device into engagement with the control device to prevent rotation of the control device, and adjusting a jam device into engagement with the staging device to prevent axial movement of both the staging device and the control device.

13. The method of claim 11, wherein the actuating step comprises engaging the cutter with a pilot and rotating the cutter with a drill through the pilot.

14. The method of claim 11, further comprising the step of forming a pilot hole in the workpiece prior to actuating the cutter so that the cutter can be accessed through the pilot hole.

15. A method of forming a countersink, comprising:
providing a tool having a cutter and a locking mechanism comprising a control nut, a staging washer, and a jam nut;
rotating the control nut such that the cutter is limited to protrude from the tool and beyond the control nut at a desired dimension;
sliding the staging washer into engagement with the control nut to prevent rotation of the control nut;
rotating the jam nut into engagement with the staging washer to prevent axial movement of both the staging washer and the control nut;
forming a pilot hole in a workpiece;
positioning the tool adjacent to one end of the pilot hole in the workpiece;
inserting a pilot through an opposite end of the pilot hole and into the cutter to engage the cutter; and
rotating the cutter relative to the tool by rotating the pilot with a power tool such that the cutter bores into said one end of the pilot hole in the workpiece to form a countersink in the workpiece in a direction toward the power tool.

16. The method of claim 11, wherein the actuating step comprises engaging the tool by inserting a driver into the tool on an end of the tool located opposite the cutter and the locking mechanism, and forming the countersink in a direction away from the driver.

17. The method of claim 11 wherein each of the adjusting, securing, and positioning steps is performed by manual power, and the actuating step is performed by a power tool.

* * * * *